US010151535B2

(12) United States Patent
Björklund et al.

(10) Patent No.: US 10,151,535 B2
(45) Date of Patent: Dec. 11, 2018

(54) ARRANGEMENT FOR FEEDING FINE-GRAINED MATTER TO A CONCENTRATE OR MATTE BURNER OF A SUSPENSION SMELTING FURNACE

(71) Applicant: Outotec (Finland) Oy, Espoo (FI)

(72) Inventors: Peter Björklund, Espoo (FI); Tapio Ahokainen, Helsinki (FI)

(73) Assignee: Outotec (Finland) Oy, Espoo (FI)

( * ) Notice: Subject to any disclaimer, the term of this patent is extended or adjusted under 35 U.S.C. 154(b) by 210 days.

(21) Appl. No.: 14/421,976

(22) PCT Filed: Aug. 26, 2013

(86) PCT No.: PCT/FI2013/050823
§ 371 (c)(1),
(2) Date: Feb. 16, 2015

(87) PCT Pub. No.: WO2014/033363
PCT Pub. Date: Mar. 6, 2014

(65) Prior Publication Data
US 2015/0233644 A1    Aug. 20, 2015

(30) Foreign Application Priority Data

Aug. 27, 2012  (FI) ..................................... 20125883

(51) Int. Cl.
*F27D 99/00*       (2010.01)
*B65G 33/24*       (2006.01)
(Continued)

(52) U.S. Cl.
CPC ......... *F27D 99/0033* (2013.01); *B65G 33/14* (2013.01); *B65G 33/24* (2013.01);
(Continued)

(58) Field of Classification Search
CPC ........ B65G 33/14; B65G 33/24; B65G 37/00; F27D 3/08; F27D 99/0003; F27D 99/0033
(Continued)

(56) References Cited

U.S. PATENT DOCUMENTS 4,005,908 A * 2/1977 Freeman ................ B65G 53/28
                                                   406/109
4,079,120 A   3/1978 Cole et al.
(Continued)

FOREIGN PATENT DOCUMENTS

CN        201215437 Y    4/2009
CN        201926315 U    8/2011
(Continued)

OTHER PUBLICATIONS

Search Report prepared by the State Intellectual Property Office of the People's Republic of China for CN 201380044892.9, dated Dec. 16, 2015, 8 pages.
(Continued)

*Primary Examiner* — Jessee R Roe
*Assistant Examiner* — Michael Aboagye
(74) *Attorney, Agent, or Firm* — Chernoff Vilhauer LLP

(57) ABSTRACT

The invention relates to an arrangement for feeding fine-grained matter to a concentrate or matte burner (1) of a suspension smelting furnace (2). The arrangement includes a screw conveyor (3) comprising a tube means (4) having an inlet opening (6), an downward-facing outlet opening (7), and a helical screw (8) for moving fine-grained matter from the inlet opening (6) to the downward-facing outlet opening (7). The downward-facing outlet opening (7) is provided with a distribution means (10). The distribution means (10) has a free end (11) configured for feeding fine-grained matter into the downward-facing outlet opening (7). The
(Continued)

helical screw (8) of the screw conveyor (3) extends from the direction of the inlet opening (6) at least partly over the downward-facing outlet opening (7).

19 Claims, 7 Drawing Sheets

(51) Int. Cl.
  *B65G 33/14* (2006.01)
  *F27D 3/08* (2006.01)
  *B65G 37/00* (2006.01)

(52) U.S. Cl.
  CPC ............... *B65G 37/00* (2013.01); *F27D 3/08* (2013.01); *F27D 99/0003* (2013.01)

(58) Field of Classification Search
  USPC ........... 266/216; 414/21, 173, 171, 175, 197
  See application file for complete search history.

(56) References Cited

U.S. PATENT DOCUMENTS

| | | | | |
|---|---|---|---|---|
| 4,206,841 A | * | 6/1980 | Lundgren | B65G 33/30 |
| | | | | 198/664 |
| 4,395,166 A | * | 7/1983 | Ulveling | C21B 5/003 |
| | | | | 266/187 |
| 5,871,619 A | | 2/1999 | Finley et al. | |
| 2009/0226284 A1 | * | 9/2009 | Kojo | C22B 15/0047 |
| | | | | 414/161 |

FOREIGN PATENT DOCUMENTS

| | | | |
|---|---|---|---|
| CN | 202221239 U | 5/2012 | |
| WO | 2005067366 A2 | 7/2005 | |
| WO | WO2009146935 | * 12/2009 | ............. B65G 33/14 |

OTHER PUBLICATIONS

Search report from priority International Application No. PCT/FI2013/050823, dated Nov. 18, 2013, 4 pgs.

* cited by examiner

ARRANGEMENT FOR FEEDING FINE-GRAINED MATTER TO A CONCENTRATE OR MATTE BURNER OF A SUSPENSION SMELTING FURNACE

CROSS-REFERENCE TO RELATED APPLICATIONS

This is a national stage application filed under 35 USC 371 based on International Application No. PCT/FI2013/050823 filed Aug. 26, 2013 and claims priority under 35 USC 119 of Finnish Patent Application No. 20125883 filed Aug. 27, 2012.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

SEQUENCE LISTING

Not Applicable.

BACKGROUND OF THE INVENTION

The invention relates to an arrangement for feeding fine-grained matter to a concentrate or matte burner of a suspension smelting furnace.

The arrangement relates to feeding of fine-grained matter such as copper sulfide concentrate or matte or copper matte or flue dust or coolant or pulverized fuel and possible flux to a concentrate or matte burner of a suspension smelting furnace such as a flash smelting furnace or a direct-to-blister furnace.

Systems for feeding fine-grained matter to a concentrate or matte burner of a suspension smelting furnace are for example presented in publication WO 2005/067366.

OBJECTIVE OF THE INVENTION

The object of the invention is to provide an improved arrangement for feeding fine-grained matter to a concentrate or matte burner of a suspension smelting furnace.

BRIEF SUMMARY OF THE INVENTION

The arrangement for feeding fine-grained matter to a concentrate or matte burner of a suspension smelting furnace of the invention is characterized by the definitions herein.

The arrangement includes a screw conveyor comprising a tube means having a circumferential inner surface, an forward-facing inlet opening in the circumferential inner surface of the tube means for feeding fine-grained matter into the tube means, an downward-facing outlet opening in the circumferential inner surface of the tube means for discharging fine-grained matter into the tube means, and a helical screw arranged around a shaft for moving fine-grained matter in the tube means from the inlet opening to the downward-facing outlet opening by rotating the helical screw.

The downward-facing outlet opening of the screw conveyor is provided with a distribution means that may extend from the direction of the inlet opening into the outlet opening. The distribution means has a free end configured for feeding fine-grained matter into the downward-facing outlet opening. The screw of the screw conveyor extends from the direction of the inlet opening of the screw conveyor at least partly over the downward-facing outlet opening.

In a preferred embodiment of the arrangement, the downward-facing outlet opening of the tube means of the screw conveyor comprises an outlet tube section, which is attached to the tube means. The outlet tube section has a circular cross section and a first central axis. In this preferred embodiment the tube means has a circular-cross section and second central axis that cuts the first central axis of the outlet tube section. In this preferred embodiment the helical screw of the screw conveyor extends from the direction of the inlet opening of the tube means of the screw conveyor over the downward-facing outlet opening a distance corresponding to between 10 and 40%, preferably corresponding to between 20 and 30%, more preferably corresponding to about 25%, of the diameter of the outlet tube section.

In a preferred embodiment of the arrangement the distribution means is forward open and in cross-section curved so that the distribution means has in cross-section a radius of curvature essentially corresponding to the radius of the circumferential inner surface of the tube means. In such embodiment the distribution means is preferably, but not necessarily, arranged in the downward-facing outlet opening so that the distribution means forms an extension of the circumferential inner surface of the tube means. In such embodiment the free end of the distribution means is preferably, but not necessarily, at least partly curved or has at least one curved section. In such embodiment the free end of the distribution means has preferably, but not necessarily, a straight section that is essentially perpendicular to at least one flight of the helical screw.

In a preferred embodiment of the arrangement the downward-facing outlet opening of the tube means of the screw conveyor comprises an outlet tube section having a circular cross section and a first central axis. In this preferred embodiment the tube means has a circular-cross section and second central axis that cuts the first central axis of the outlet tube section. In this preferred embodiment of the arrangement the circular cross section of the outlet tube section of the downward-facing outlet opening defines a first quadrant limited by a first imaginary line parallel with vertical plane that cuts a common rotation axis of the shaft and the helical screw and limited by a second imaginary line that is perpendicular to the first imaginary line and that cuts the first central axis of the outlet tube section. The circular cross section of the outlet tube section of the downward-facing outlet opening defines additionally a second quadrant adjacent to the first quadrant. The second quadrant is situated on the same side of the first imaginary line as the first quadrant. The circular cross section of the outlet tube section of the downward-facing outlet opening defines additionally a third quadrant adjacent to the second quadrant. The third quadrant is situated on the other side of the first imaginary line compared to the second quadrant. The circular cross section of the outlet tube section of the downward-facing outlet opening defines additionally a fourth quadrant between the first quadrant and the third quadrant. In this preferred embodiment of the arrangement the distribution means is attached to the inner periphery of the outlet tube section of the downward-facing outlet opening so that the distribution means is attached to the inner periphery of the outlet tube section of the downward-facing outlet opening along between 50 and 100% of the first quadrant and along between 10 and 90% of the arc of the second quadrant and along between 10 and 90% of the arc of the fourth quadrant. In this preferred embodiment of the arrangement the free end of the distribution means is partly curved or straight. In this preferred embodiment of the arrangement, the distribution means is preferably, but not necessarily, fastened to the inner periphery of the outlet tube section so that it is prevented from flowing between the distribution means and the inner periphery of the outlet tube section.

In a preferred embodiment of the arrangement, the free end of the distribution means has a straight section, and the helical screw comprises at least one flight that is essentially perpendicular to the straight section of the distribution means.

The arrangement provides for even feeding of fine-grained matter from the downward-facing outlet opening of the screw conveyor. Even feed of fine-grained matter leads to several process advantages in the suspension smelting furnace such as more even pressure distribution in the suspension smelting furnace, more effective use of oxygen in the suspension smelting furnace, and better quality of the slag in the slag layer that is formed in the settler of the suspension smelting furnace (lower Cu % or lower Ni % and lower $Fe_3O_4$% in the slag layer) with the same process parameters.

BRIEF DESCRIPTION OF THE SEVERAL VIEWS OF THE DRAWINGS

In the following the invention will described in more detail by referring to the figures of which

DETAILED DESCRIPTION OF THE INVENTION

Figure 1:
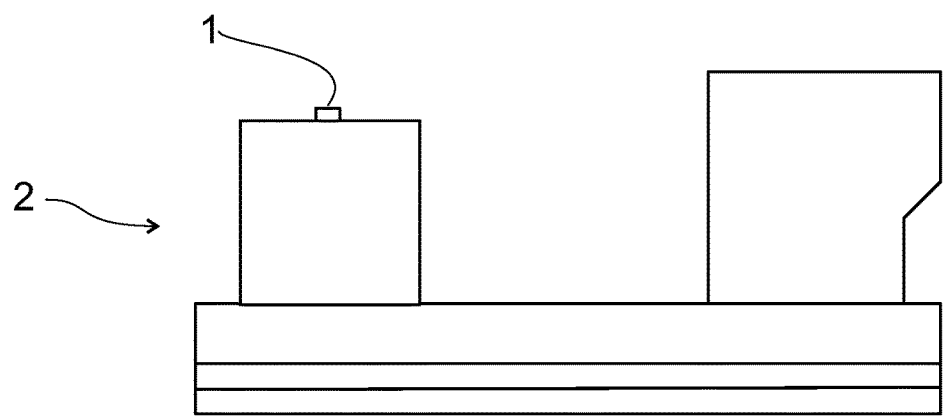
FIG. 1 shows a suspension smelting furnace provided with a concentrate or matte burner.

The invention relates to an arrangement for feeding fine-grained matter to a concentrate or matte burner 1 of a suspension smelting furnace 2 such as a flash smelting furnace or a direct-to-blister smelting furnace.

The fine-grained matter may for example comprise copper matte and/or copper sulfide concentrate or matte or flue dust or coolant or pulverized fuel or possible flux.

The arrangement includes a screw conveyor 3 comprising a tube means 4 having a circumferential inner surface 5, an inlet opening 6 for feeding fine-grained matter into the tube means 4, a downward-facing outlet opening 7 in the circumferential inner surface 5 of the tube means 4 for discharging fine-grained matter from the tube means 4, and a helical screw 8 arranged around a shaft 9 for moving fine-grained matter in the tube means 4 from the inlet opening 6 to the downward-facing outlet opening 7 by rotating the helical screw 8.

In a preferred embodiment of the arrangement, the downward-facing outlet opening 7 of the tube means 4 of the screw conveyor 3 comprises an outlet tube section 21, which is attached to the tube means 4 of the screw conveyor 3. In this preferred embodiment the outlet tube section 21 has a circular cross section and a first central axis C. In this preferred embodiment the tube means 4 of the screw conveyor 3 has a circular-cross section and second central axis D that cuts the first central axis C of the outlet tube section 21.

The downward-facing outlet opening 7 of the tube means 4 of the screw conveyor 3 is provided with a distribution means 10.

In the figures the downward-facing outlet opening 7 of the tube means 4 of the screw conveyor 3 has a circular or round form, but alternatively the downward-facing outlet opening 7 of the tube means 4 of the screw conveyor 3 could for example have the shape of a polygon, such as triangle, quadrilateral, quadrant, pentagon, or hexagon.

The distribution means 10 may be in the form of a plate such as a metal plate.

The distribution means 10 may be forward open and in horizontal cross-section at least partly V-shaped or curved.

The distribution means 10 has a free end 11 configured for feeding fine-grained matter into the downward-facing outlet opening 7.

The helical screw 8 of the screw conveyor 3 extends from the direction of the inlet opening 6 at least partly over the downward-facing outlet opening 7.

In other words, the screw conveyor 3 defines a conveying direction (marked with "A" in FIG. 2) extending from the inlet opening 6 to the downward-facing outlet opening 7 and the helical screw 8 of the screw conveyor 3 extends in this conveying direction from the direction of the inlet opening 6 at least partly over the downward-facing outlet opening 7.

In a preferred embodiment of the arrangement, the downward-facing outlet opening 7 of the tube means 4 of the screw conveyor 3 comprises an outlet tube section 21, which is attached to the tube means 4 of the screw conveyor 3. This preferred embodiment the outlet tube section 21 has a circular cross section and a first central axis C. In this preferred embodiment the tube means 4 of the screw conveyor 3 has a circular-cross section and second central axis D that cuts the first central axis C of the outlet tube section 21. In this preferred embodiment the helical screw 8 of the screw conveyor 3 extends from the direction of the inlet opening 6 over the downward-facing outlet opening 7 of the tube means 4 of the screw conveyor 3 a distance corresponding to between 10 and 40%, preferably corresponding to between 20 and 30%, more preferably corresponding to about 25%, of the diameter of the outlet tube section 21.

In the arrangement, the inlet opening 6 of the tube means 4 of the screw conveyor 3 can be in communication with a dosing bin 13, and a loss-in-weight controller 12 can be arranged between the dosing bin 13 and the forward-facing inlet opening 6 of the tube means 4 of the screw conveyor 3 for controlling the feeding of fine-grained matter from the dosing bin 13 to the screw conveyor 3.

The dosing bin 13 may in turn be arranged in communication with a fluidization means 14 for fluidizing fine-grained matter so that a filling valve 15 is provided between the fluidization means 14 and the dosing bin 13 for opening and closing the communication between the fluidization means 14 and the dosing bin.

Figure 2:
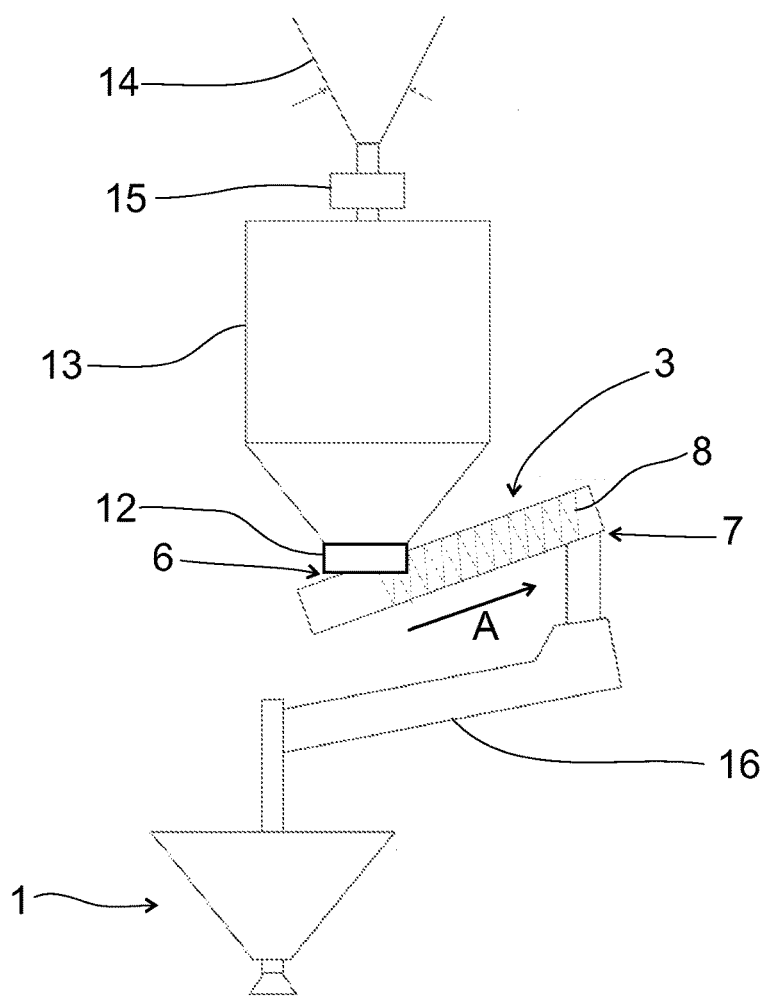
FIG. 2 shows an embodiment of an arrangement for feeding fine-grained matter to a concentrate or matte burner of a suspension smelting furnace.

The downward-facing outlet opening 7 of the tube means 4 of the screw conveyor 3 may be in communication with a conveyor means 16 that is in communication with the concentrate or matte burner 1 of the suspension smelting furnace 2. The conveyor means 16 may, as shown in FIG. 2, be a slide chute, air slide or drag chain conveyor or a combination of these leading to the concentrate or matte burner 1 of the suspension smelting furnace 2.

The distribution means 10 may in the downward-facing outlet opening 7 of the tube means 4 of the screw conveyor 3 be fastened between the tube means 4 of the screw conveyor 3 and a conveyor means 16 that is in communication with the concentrate or matte burner 1 of the suspension smelting furnace 2. The conveyor means 16 may, as shown in FIG. 2, be a slide chute, air slide or drag chain conveyor or a combination of these leading to the concentrate or matte burner 1 of the suspension smelting furnace 2.

The distribution means 10 may in the downward-facing outlet opening 7 of the tube means 4 of the screw conveyor 3 be fastened to a flange means 20, which is fastened between the tube means 4 of the screw conveyor 3 and a conveyor means 16 that is in communication with the concentrate or matte burner 1 of the suspension smelting furnace 2. The conveyor means 16 may, as shown in FIG. 2, be a slide chute, air slide or drag chain conveyor or a combination of these leading to the concentrate or matte burner 1 of the suspension smelting furnace 2. Fastening the distribution means 10 to a flange means 20 provides for easier removal of the flange means 20 for example if the distribution means 10 needs to be repaired or exchanged.

The distribution means 10 may in the downward-facing outlet opening 7 of the tube means 4 of the screw conveyor 3 be fastened to a flange means 20, which is fastened between an outlet tube section 21 of the downward-facing outlet 7 of the tube means 4 of the screw conveyor 3 and a conveyor means 16 that is in communication with the concentrate or matte burner 1 of the suspension smelting furnace 2. The conveyor means 16 may, as shown in FIG. 2, be a slide chute, air slide or drag chain conveyor or a combination of these leading to the concentrate or matte burner 1 of the suspension smelting furnace 2. Fastening the distribution means 10 to a flange means 20 provides for easier removal of the flange means 20 for example if the distribution means 10 needs to be repaired or exchanged.

The distribution means 10 may also be fastened by means of external fastening means such as screw means (not shown in the drawings) in the downward-facing outlet opening 7.

Figure 3:
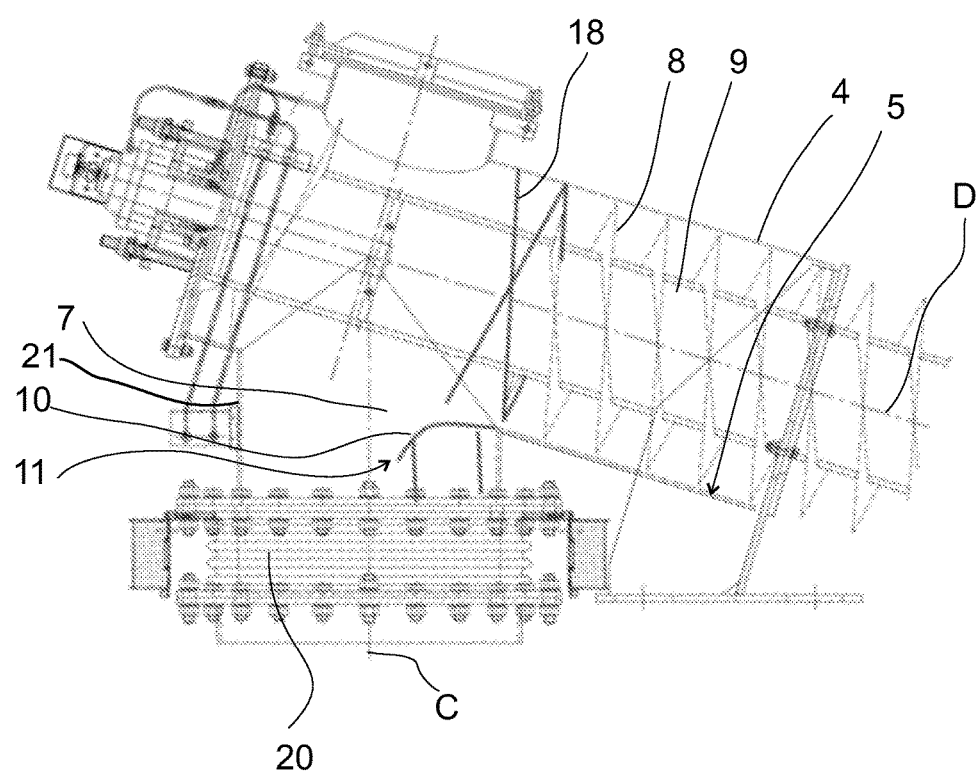
FIG. 3 is a vertical cross-sectional detail view showing from one side the downward-facing outlet opening of the screw conveyor in one embodiment of the arrangement.
Figure 6:
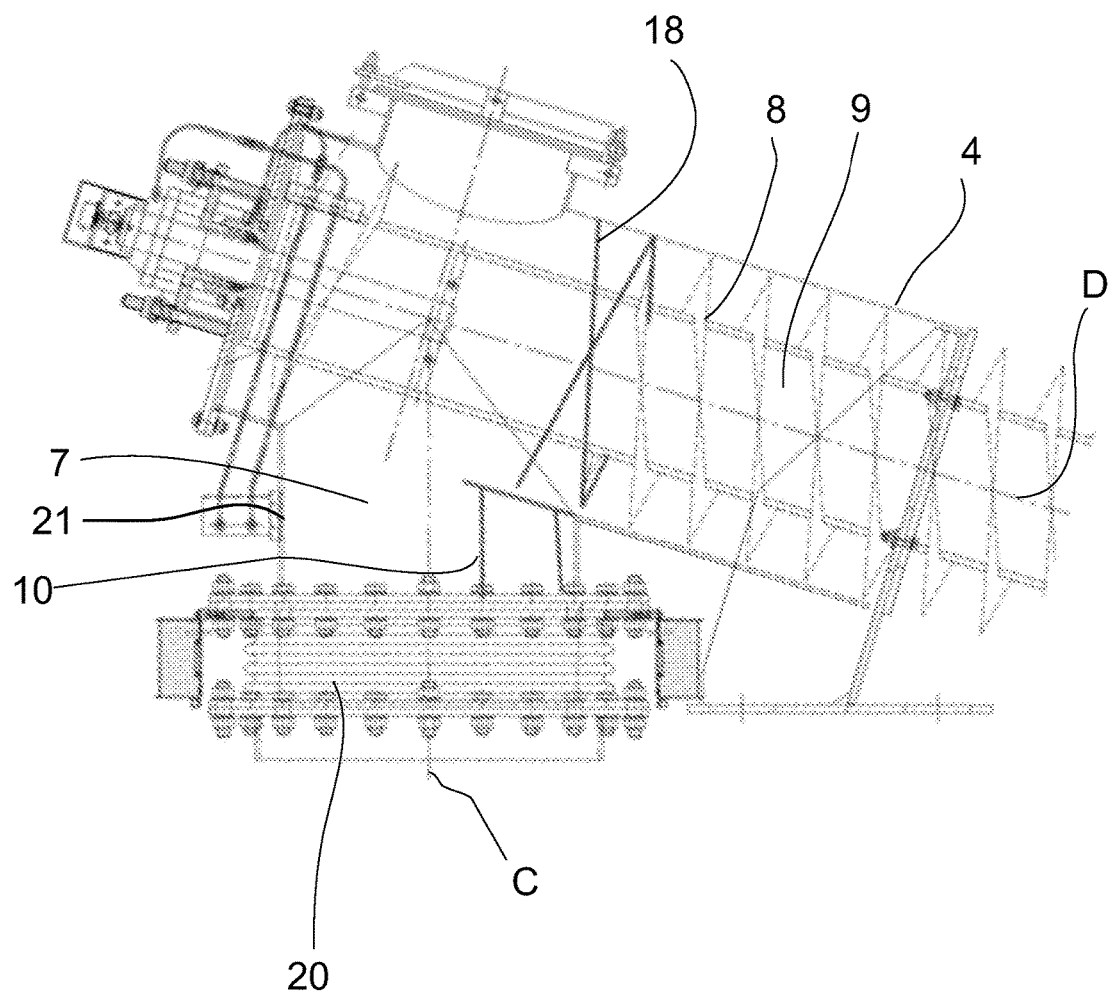
FIG. 6 is a vertical cross-sectional detail view showing from one side the downward-facing outlet opening of the screw conveyor in another embodiment of the arrangement

The distribution means 10 may extend from the direction of the inlet opening 6 into the downward-facing outlet opening 7. In other words, the screw conveyor 3 defines a conveying direction (marked with "A" in FIG. 2) extending from the inlet opening 6 to the downward-facing outlet opening 7 and the distribution means 10 may extend in this conveying direction from the direction of the forward-facing inlet opening 6 at least partly into the downward-facing outlet opening 7. The distribution means 10 may have an at least partly downward into the outlet opening 7 slanted configuration. Alternatively or additionally, the distribution means 10 may have an at least partly downward into the outlet opening 7 curved configuration. The distribution means 10 may, as shown in FIG. 6, have a downward into the outlet opening 7 slanted configuration. In the arrangement shown in FIG. 3, the distribution means 10 has a downward into the outlet opening 7 curved configuration.

In the arrangement the distribution means 10 may be forward open and be in cross-section curved so that the distribution means 10 has in cross-section a radius of curvature essentially corresponding to the radius of the circumferential inner surface 5 of the tube means 4. In such case the distribution means 10 is preferably, but not necessarily, arranged in the downward-facing outlet opening 7 so that the distribution means 10 forms an extension of the circumferential inner surface 5 of the tube means 4. In such case the free end 11 of the distribution means 10 is preferably, but not necessarily, at least partly curved. In such case the free end 11 of the distribution means 10 has preferably, but not necessarily, a straight section 19 that is essentially perpendicular to at least one flight 18 of the helical screw 8.

Figure 9:
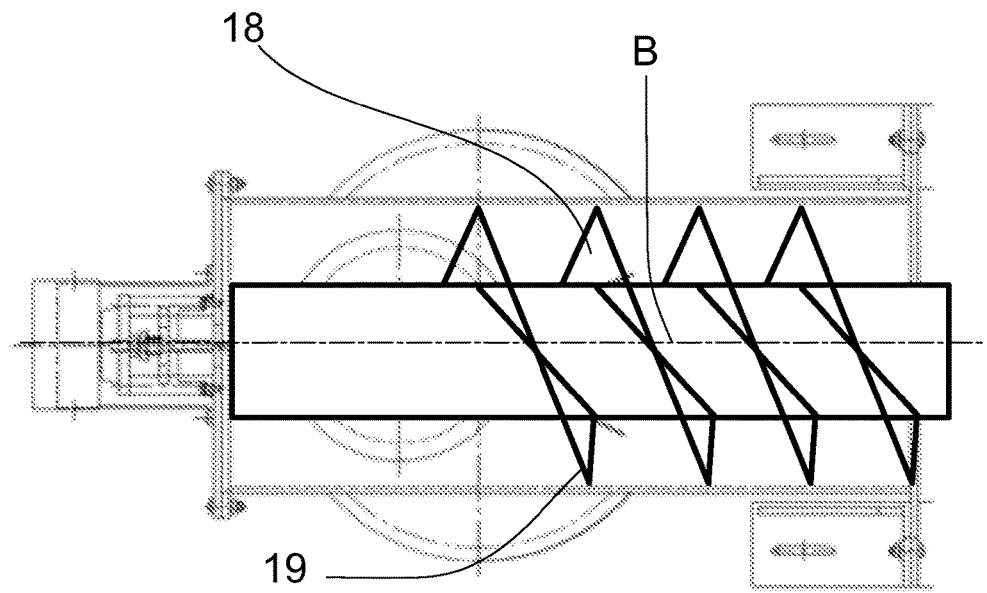
FIG. 9 shows from above a detail of the detail shown in FIGS. 4 and 6.
Figure 10:
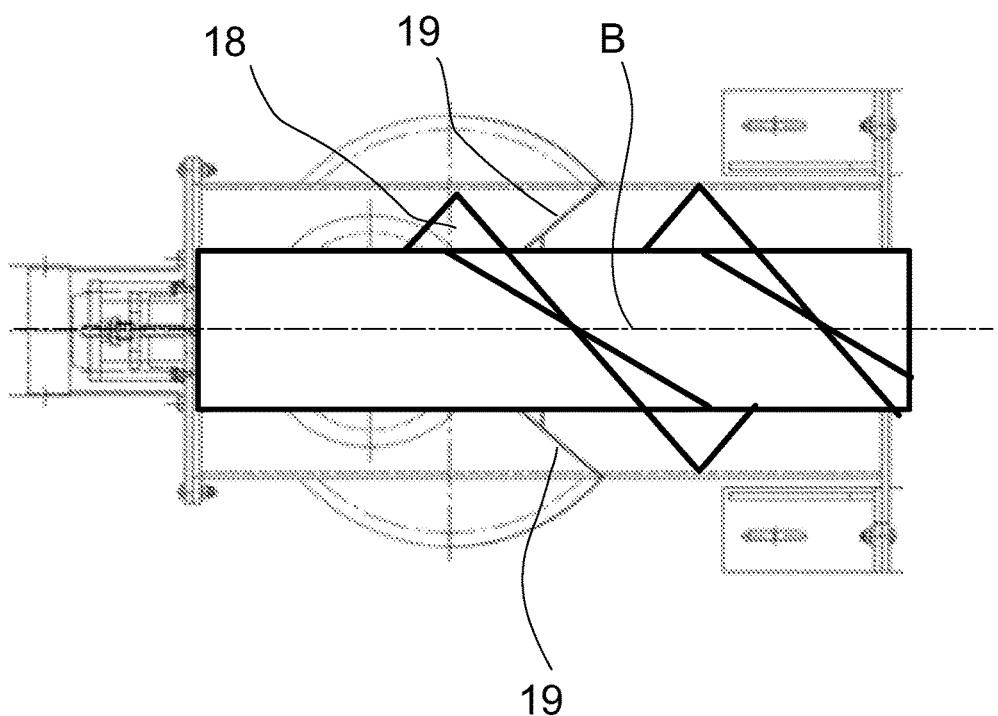
FIG. 10 shows from above an alternative configuration of the detail shown in FIG. 9.

The free end 11 of the distribution means 10 may have a straight section 19, and the helical screw 8 may comprise at least one flight 18 that is essentially perpendicular to said straight section 19 of the distribution means 10 as shown in FIGS. 9 and 10.

The free end 11 of the distribution means 10 may consist of two straight sections 19, and the helical screw 8 may comprise at least one flight 18 that is essentially perpendicular to one of said two straight sections 19 of the distribution means 10.

Figure 4:
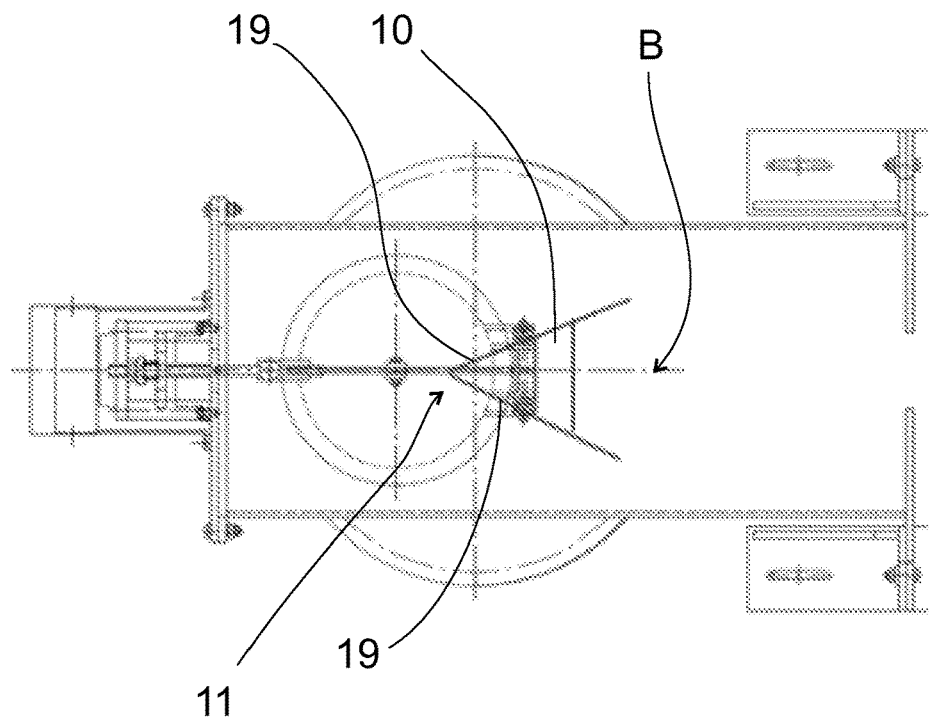
FIG. 4 shows from above a detail of the detail shown in FIG. 3.
Figure 5:
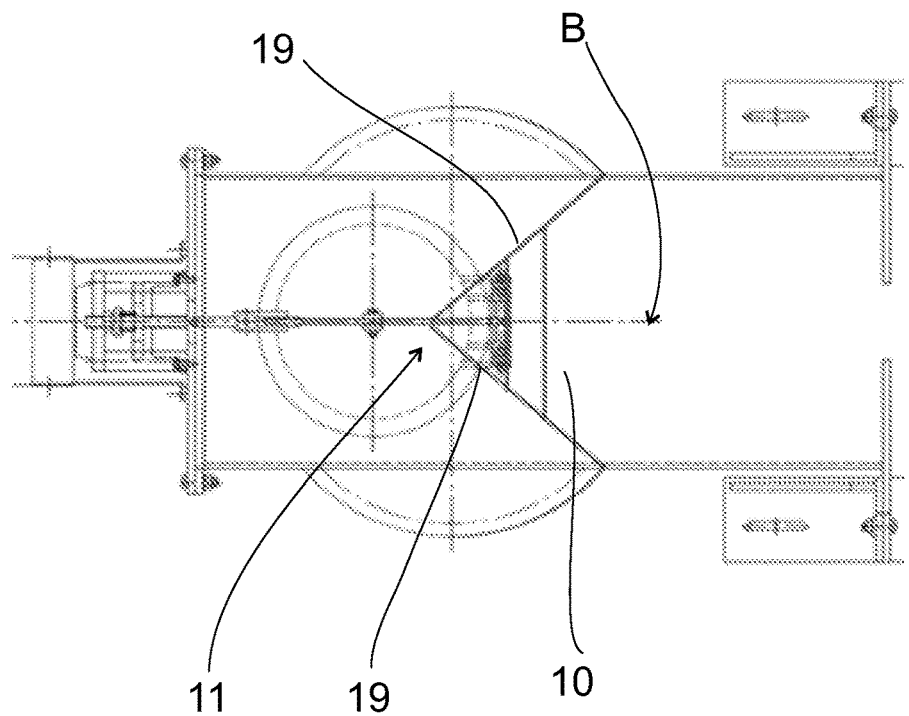
FIG. 5 shows from above an alternative configuration of the detail shown in FIG. 4.
Figure 7:
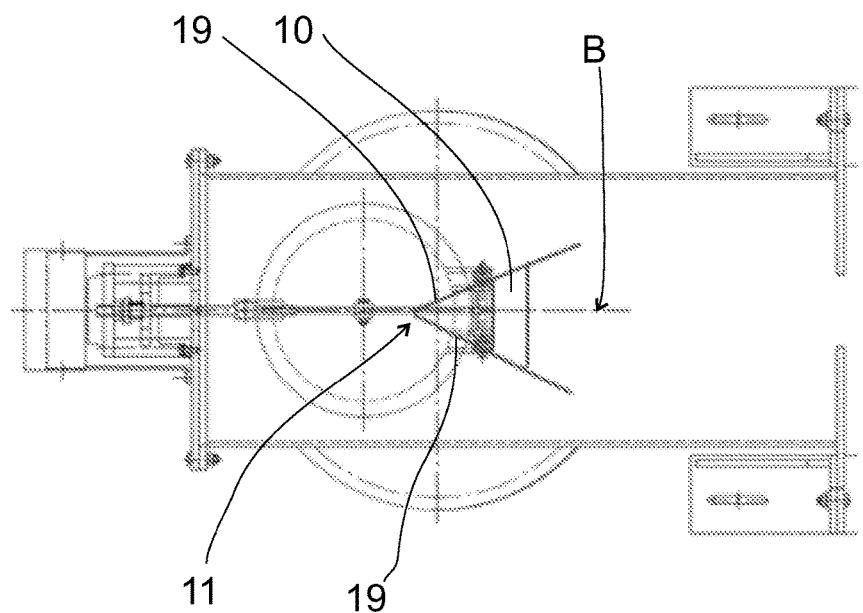
FIG. 7 shows from above a detail of the detail shown in FIG. 6.
Figure 8:
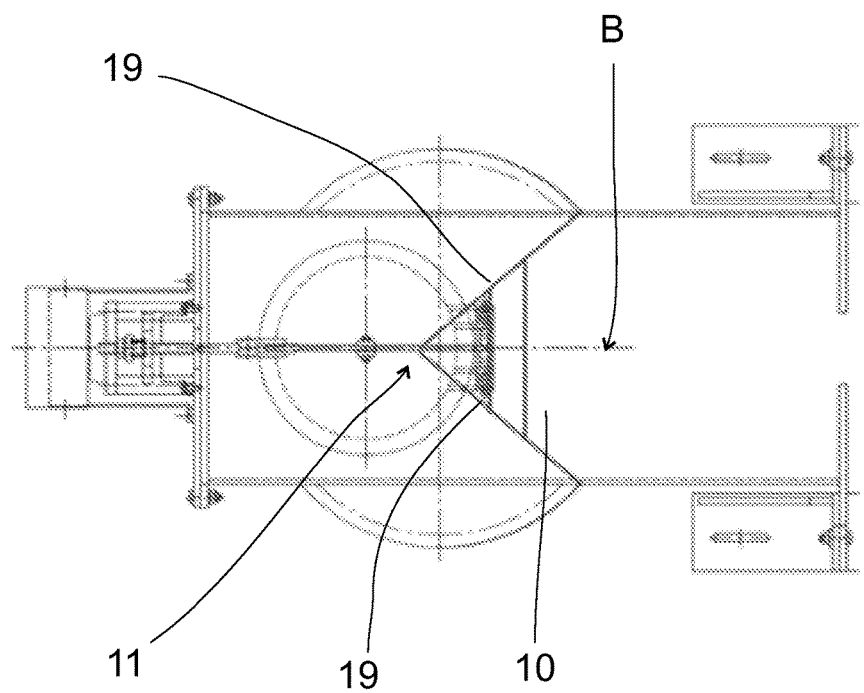
FIG. 8 shows from above an alternative configuration of the detail shown in FIG. 7

The distribution means 10 may, as shown in FIGS. 4 to 5 and 7 to 8, be symmetrical with respect to a vertical plane (marked with "B" in FIGS. 4, 5, 7, and 8) that cuts a common rotation axis of the shaft 9 and the helical screw 8. As an alternative, the distribution means 10 may be asymmetrical with respect to a vertical plane B that cuts a common rotation axis of the shaft 9 and the helical screw 8 so that the distribution means 10 is arranged essentially completely on one side of said vertical plane. FIGS. 4 and 7 shows embodiments where the angle between the straight sections 19 is smaller than the corresponding angle in FIGS. 5 and 8.

Figure 11:
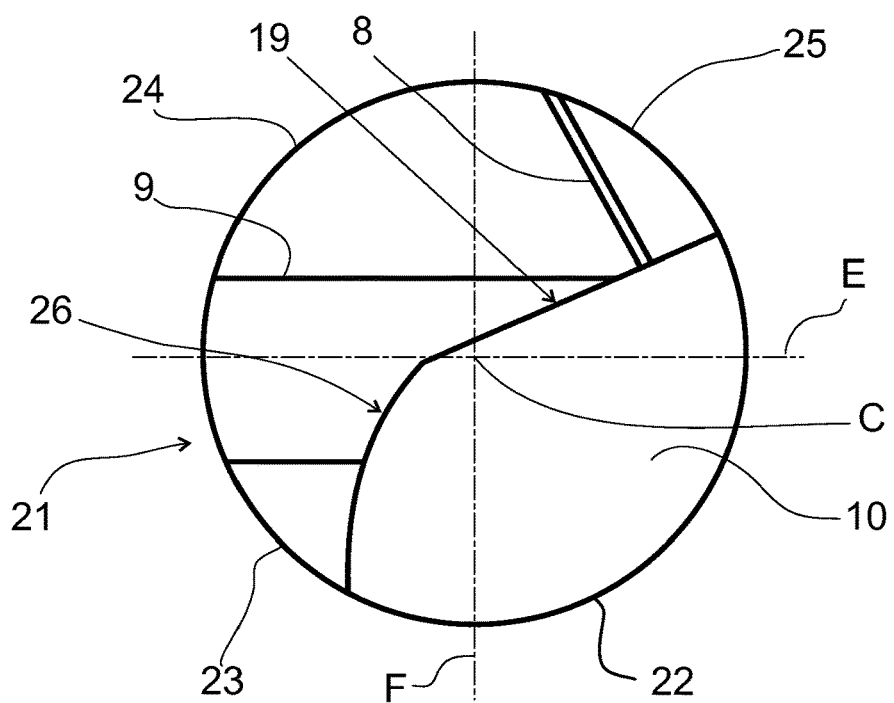
FIG. 11 shows an embodiment of the arrangement as seen from below through an outlet tube section of the downward-facing outlet opening.
Figure 12:
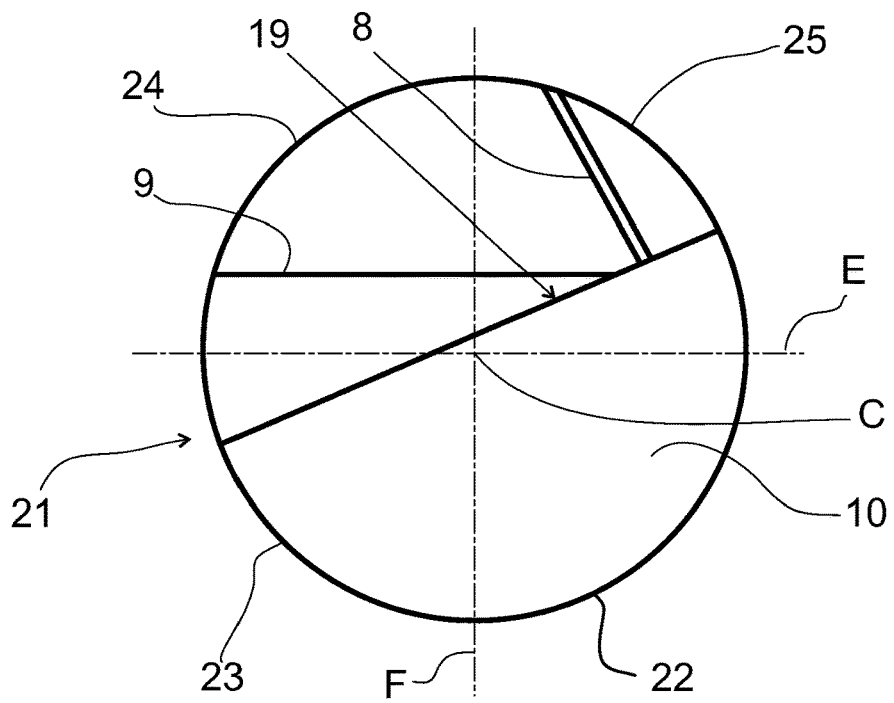
FIG. 12 shows an embodiment of the arrangement as seen from below through an outlet tube section of the downward-facing outlet opening.

In an embodiment of the arrangement, such as in the embodiment shown in FIG. 11, the downward-facing outlet opening 7 of the tube means 4 of the screw conveyor 3 comprises an outlet tube section 21 having a circular cross section and a first central axis C. In this embodiment of the arrangement the tube means 4 has a circular-cross section and second central axis D that cuts the first central axis C of the outlet tube section 21 of the downward-facing outlet opening 7. In this embodiment of the arrangement the circular cross section of the outlet tube section 21 of the downward-facing outlet opening 7 defines a first quadrant 22 limited by a first imaginary line E parallel with the vertical plane B that cuts a common rotation axis of the shaft 9 and the helical screw 8 and limited by a second imaginary line F that is perpendicular to the first imaginary line E and that cuts the first central axis C of the outlet tube section 21. In this embodiment of the arrangement the circular cross section of the outlet tube section 21 of the downward-facing outlet opening 7 defines additionally a second quadrant 23 adjacent to the first quadrant 22. The second quadrant 23 is situated on the same side of the first imaginary line E as the first quadrant 22. In this embodiment of the arrangement the circular cross section of the outlet tube section 21 of the downward-facing outlet opening 7 defines additionally a third quadrant 24 adjacent to the second quadrant 23. The third quadrant 24 is situated on the other side of the first imaginary line E compared to the second quadrant 23. In this embodiment of the arrangement the circular cross section of the outlet tube section 21 of the downward-facing outlet opening 7 defines additionally a fourth quadrant 25 between the first quadrant 22 and the third quadrant 24. In this preferred embodiment of the arrangement, the distribution means 10 in attached to the inner periphery of the outlet tube section 21 of the downward-facing outlet opening 7 so that the distribution means 10 is attached to the inner periphery of the outlet tube section 21 of the downward-facing outlet opening 7 between 50 and 100% of the of the first quadrant 22 and along between 10 and 90% of the arc of the second quadrant 23 and along between 10 and 90% of the arc of the fourth quadrant 25. In this preferred embodiment of the arrangement, the free end 11 of the distribution means 10 is at least partly curved or has at least one curved section 26. In this preferred embodiment of the arrangement, the distribution means 10 is preferably, but not necessarily, fastened to the inner periphery of the outlet tube section 21 so that fine-grained matter is prevented from flowing between the and the inner periphery of the outlet tube section 21 of the downward-facing outlet opening 7 between 50 and 100% of the of the first quadrant 22 and along between 10 and 90% of the arc of the second quadrant 23 and along between 10 and 90% of the arc of the fourth quadrant 25.

The inlet opening 6 of the screw conveyor 3 for feeding fine-grained matter into the tube means 4 may, as shown in the figures, be in the form of an forward facing inlet opening 6 in the circumferential inner surface 5 of the tube means 4 for feeding fine-grained matter into the tube means 4.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. An arrangement for feeding fine-grained matter to a concentrate or matte burner of a suspension smelting furnace, wherein the arrangement includes a screw conveyor comprising
    a tube means having a circumferential inner surface,
    an inlet opening for feeding fine-grained matter into the tube means,
    a downward-facing outlet opening in the circumferential inner surface of the tube means for discharging fine-grained matter from the tube means, and
    a helical screw arranged around a shaft for moving fine-grained matter in the tube means from the inlet opening to the downward-facing outlet opening by rotating the helical screw,
characterized
    by the downward-facing outlet opening of the tube means of the screw conveyor being provided with a distribution means
    where the distribution means (a) has free end configured for feeding fine-grained matter into the downward-facing outlet opening,
    (b) extends from a direction of the inlet opening into the downward-facing outlet opening in at least one of a slanted and curved configuration;
    (c) is forward open and is cross-section curved so that the distribution means has in cross-section a radius of curvature essentially corresponding to a radius of a circumferential inner surface of the tube means; and
    (d) forms an extension of the circumferential inner surface of the tube means of the screw conveyor, and further characterized
    by the helical screw of the screw conveyor extending from the direction of the inlet opening at least partly over the downward-facing outlet opening.

2. The arrangement according to claim 1, characterized
    by the downward-facing outlet opening of the tube means of the screw conveyor comprising an outlet tube section, which is attached to the tube means of the screw conveyor and which has a circular cross section and a first central axis C,
    by the tube means of the screw conveyor having a circular-cross section and second central axis D that cuts the first central axis C of the tube means of the screw conveyor, and
    by the helical screw of the screw conveyor extending from the direction of the inlet opening of tube means over the downward-facing outlet opening of the tube means a distance corresponding to between 10 and 40% of the diameter of the outlet tube section.

3. The arrangement according to claim 1, characterized
    by the inlet opening of the tube means of the screw conveyor being in communication with a dosing bin, and
    by a loss-in-weight controller being arranged between the dosing bin and the inlet opening of the tube means of the screw conveyor for controlling the feeding of fine-grained matter from the dosing bin to the screw conveyor.

4. The arrangement according to claim 3, characterized by the dosing bin being arranged in communication with a fluidization means for fluidizing fine-grained matter, and
    by a filling valve being provided between the fluidization means and the dosing bin for opening and closing the communication between the fluidization means and the dosing bin.

5. The arrangement according to claim 1, characterized by the downward-facing outlet opening being in communication with a conveyor means that is in communication with the concentrate or matte burner of the suspension smelting furnace.

6. The arrangement according to claim 1, characterized by the distribution means being in the downward-facing outlet opening fastened between the tube means of the screw conveyor and a conveyor means that is in communication with the concentrate or matte burner of the suspension smelting furnace.

7. The arrangement according to claim 1, characterized
    by the distribution means being in the downward-facing outlet opening fastened to a flange means, and
    by the flange means being fastened between the tube means of the screw conveyor and a conveyor means that is in communication with the concentrate or matte burner of the suspension smelting furnace.

8. The arrangement according to claim 1, characterized by the distribution means being in the downward-facing outlet opening fastened to a flange means, and
by the flange means being fastened between an outlet tube section of the downward-facing outlet opening of the tube means of the screw conveyor and a conveyor means that is in communication with the concentrate or matte burner of the suspension smelting furnace.

9. The arrangement according to claim 1, characterized by the distribution means being in the downward-facing outlet opening fastened by means of external fastening means such as screw means.

10. The arrangement according to claim 5, characterized by the conveyor means being a slide chute, air slide or drag chain conveyor or a combination of these leading to the concentrate or matte burner of the suspension smelting furnace.

11. The arrangement according to claim 1, characterized by the distribution means being forward open and in cross-section at least partly V-shaped or curved.

12. The arrangement according to claim 1, characterized by the free end of the distribution means being at least partly curved.

13. The arrangement according to claim 1, characterized by the free end of the distribution means having a straight section that is essentially perpendicular to at least one flight of the helical screw.

14. The arrangement according to claim 1, characterized by the free end of the distribution means has a straight section, and
by the helical screw comprises at least one flight that is essentially perpendicular to the straight section of the distribution means.

15. The arrangement according to claim 1, characterized by the free end of the distribution means being formed of two straight sections, and
by the helical screw comprises at least one flight that is essentially perpendicular to one of said two straight sections of the distribution means.

16. The arrangement according to claim 1, characterized by the distribution means being symmetrical with respect to a vertical plane B that cuts a common rotation axis of the shaft and the helical screw.

17. The arrangement according to claim 1, characterized by the distribution means being asymmetrical with respect to a vertical plane B that cuts a common rotation axis of the shaft and the helical screw so that the distribution means is arranged essentially completely on one side of said vertical plane B.

18. The arrangement according to claim 1, characterized by the distribution means being arranged in the downward-facing outlet opening of the tube means of the screw conveyor so that fine-grained matter is prevented from flowing between the downward-facing outlet opening of the tube means of the screw conveyor and the distribution means.

19. The arrangement according to claim 1, characterized by the inlet opening of the screw conveyor for feeding fine-grained matter into the tube means being in the form of an forward facing inlet opening in the circumferential inner surface of the tube means for feeding fine-grained matter into the tube means.

* * * * *